United States Patent
Opitz et al.

(10) Patent No.: US 7,980,126 B2
(45) Date of Patent: *Jul. 19, 2011

(54) METHOD FOR OPERATING HOT-FILM AIR-MASS SENSORS

(75) Inventors: Bernhard Opitz, Leonberg (DE); Uwe Konzelmann, Asperg (DE); Christoph Gmelin, Stuttgart (DE); Araceli Pison, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 511 days.

This patent is subject to a terminal disclaimer.

(21) Appl. No.: 11/887,884

(22) PCT Filed: Feb. 23, 2006

(86) PCT No.: PCT/EP2006/060214
§ 371 (c)(1),
(2), (4) Date: Dec. 23, 2008

(87) PCT Pub. No.: WO2006/108733
PCT Pub. Date: Oct. 19, 2006

(65) Prior Publication Data
US 2009/0205417 A1    Aug. 20, 2009

(30) Foreign Application Priority Data
Apr. 11, 2005  (DE) .......................... 10 2005 016 447

(51) Int. Cl.
*G01F 1/692* (2006.01)
(52) U.S. Cl. .................................................. 73/204.26
(58) Field of Classification Search .................. None
See application file for complete search history.

(56) References Cited

U.S. PATENT DOCUMENTS

| | | | |
|---|---|---|---|
| 4,596,138 A * | 6/1986 | Ito et al. | 73/114.34 |
| 4,785,662 A * | 11/1988 | Ohta et al. | 73/204.21 |
| 4,833,912 A | 5/1989 | Ohta et al. | |
| 5,255,642 A | 10/1993 | Pischke et al. | |
| 6,845,660 B2 * | 1/2005 | Hecht et al. | 73/204.17 |
| 2003/0154807 A1 * | 8/2003 | Hecht et al. | 73/866.1 |
| 2004/0007245 A1 | 1/2004 | Hecht et al. | |
| 2007/0137298 A1 * | 6/2007 | Konzelmann et al. | 73/204.26 |
| 2007/0144239 A1 * | 6/2007 | Konzelmann et al. | 73/25.01 |
| 2008/0264166 A1 * | 10/2008 | Wienand et al. | 73/204.26 |
| 2009/0211355 A1 * | 8/2009 | Renninger et al. | 73/204.26 |

FOREIGN PATENT DOCUMENTS

| | | |
|---|---|---|
| DE | 196 01 791 | 7/1997 |
| DE | 101 11 840 | 6/2003 |

* cited by examiner

*Primary Examiner* — Harshad Patel
(74) *Attorney, Agent, or Firm* — Kenyon & Kenyon LLP

(57) ABSTRACT

A method is provided for operating a hot-film air-mass sensor, which can be used especially for measuring air mass flows in the intake tract of an internal combustion engine. The hot-film air-mass sensor has a sensor chip having a sensor frame and a sensor diaphragm having at least one heating element and at least two temperature sensors, a chip carrier for holding the sensor chip and at least one additional heating element. The sensor chip is able to be heated up using the at least one additional heating element. Immediately after shutting down the internal combustion engine, the at least one heating element of the sensor diaphragm is switched off, or is switched to a lower heating power. Furthermore, the at least one additional heating element is switched on for a specified postheating phase. The provided method is particularly suitable for avoiding oil contamination of the hot-film air-mass sensor.

11 Claims, 3 Drawing Sheets

METHOD FOR OPERATING HOT-FILM AIR-MASS SENSORS

FIELD OF THE INVENTION

The present invention relates to a method for operating hot-film air-mass sensors. Such hot-film air-mass sensors are used particularly for measuring air masses in the intake tract of an internal combustion engine. The present invention particularly relates to a method whereby oil contamination of hot-film air-mass sensors can be avoided.

BACKGROUND INFORMATION

In many processes, for instance, in the field of industrial processing engineering, chemistry or machine construction, a gas mass, especially an air mass, has to be supplied in a specific manner. Among these are combustion processes, which run under regulated conditions. In this context, an important example is the combustion of fuel in internal combustion engines of motor vehicles, especially having subsequent catalytic exhaust gas purification. Various types of sensors are used, in this instance, to measure the air mass throughput.

One sensor type from the related art is the so-called hot-film air-mass sensor (HFM), which is discussed in one specific embodiment, for instance, in DE 196 01 791 A1. Usually, in such hot-film air-mass sensors, a thin sensor diaphragm is applied on a sensor chip, for instance, a silicon sensor chip. On the sensor diaphragm there is typically situated at least one heating resistor, which is surrounded by two or more temperature measuring resistors. In an air flow, that is conducted over the diaphragm, the temperature distribution changes, which, in turn, can be recorded by the temperature measuring resistors. Consequently, an air mass flow can be determined, for example, from the difference in resistance of the temperature measuring resistors. Various other variations of this sensor type are from the related art.

One difficulty with this type of sensor from, for example, DE 101 11 840 C2 is that contamination of the sensor chip, such as with oil, can frequently appear. The sensor chip is normally used either directly in the intake tract of the internal combustion engine, or in a bypass of the intake tract of the internal combustion engine. Even in the operation of the internal combustion engine, oil may deposit on the sensor chip and especially on the sensor diaphragm. This oil deposit can lead to an undesired effect on the measuring signal of the sensor chip, especially since an oil film on the surface of the sensor chip has an effect on the thermal conductivity of the surface, which leads to a corruption of the measuring signals.

This oil contamination appears particularly during, or shortly after the shutting down of the internal combustion engine, for instance, of a Diesel engine. After shutting down the internal combustion engine, an overpressure present in a crankcase typically becomes reduced via a crankcase ventilation into the intake tract of the internal combustion engine. In this context, oil vapor or oil mist is frequently carried along, which is in a position to deposit as an oil film in the intake tract, and thus also on the air-mass flow sensor situated there (or in a corresponding bypass).

German patent document DE 101 11 840 C2 therefore proposes a sensor chip which has a frame element, for instance, of silicon, having a diaphragm applied onto it. Various metal traces are situated on the diaphragm, which function as electric heaters and/or measuring resistors, whereby the region of the diaphragm forms a sensor region. Moreover, on the surface of the sensor chip, in addition, at least one additional heater is situated, which can be heated electrically in such a way that, in the region of the additional heater, thermal gradient turbulences (whirls) are formed, which lead to depositing of contamination in the region of the additional heater, out of the way of the region of the sensor region.

However, this device from the related art has various disadvantages. A substantial part is that, in DE 101 11 840 C2, the additional heater is situated directly near or even on the sensor diaphragm. This is conditioned, in the device described, particularly because the silicon sensor chip has only a small surface, so that a positioning of additional heater and sensor diaphragm at a distance has to be implemented technically. This adjacent positioning of additional heater and sensor diaphragm can, however, in the case of heavy oil loading, lead to oil droplets flowing back onto the sensor diaphragm, and can consequently, in turn, lead to contamination of the sensor diaphragm, and to a change in thermal conductivity connected therewith, and consequently to a signal drift.

Furthermore, one disadvantage of the situation in DE 101 11 840 C2 is the so-called Marangoni effect, which is the development of different surface tensions at different temperatures. An oil film has a greater surface tension with respect to air in a cold state than in a hot state. If there is a thermal gradient in a liquid, the Marangoni effect usually leads to a fluid motion from warmer zones to colder zones. Consequently, the device in DE 101 11 840 C2, can even have the disadvantage that oil droplets on the surface of the sensor chip are pushed from the additional heater to the sensor diaphragm, and thus the contamination of the sensor diaphragm is even increased, instead of lowered.

An additional disadvantage of the device known from the related art is that the main contamination by oil, as described above, appears at, or shortly after the shutting down of the internal combustion engine, since, at that time, oil mists diffuse through the intake tract and the bypass all the way to the hot-film air-mass sensor, and contaminate it. The devices known from the related art do not take into account this special circumstance, and thus they have the disadvantage that, immediately after shutting down the internal combustion engine, the hot-film air-mass sensor is strongly contaminated with oil.

SUMMARY OF THE INVENTION

A method is therefore proposed for operating a hot-film air-mass sensor for measuring air mass flows in the intake tract of an internal combustion engine, which to a great extent compensates for the disadvantages of the devices known from the related art and improves methods known from the related art. The method according to the present invention is particularly suitable for measuring air mass flows in the intake tract of internal combustion engines, but can also be used for operating hot-film air-mass sensors that are utilized in a different manner.

The method uses a hot-film air-mass sensor which has a sensor chip having a sensor frame and a sensor diaphragm having at least one heating element and at least two temperature sensors, the hot-film air-mass sensor also having a chip carrier for holding the sensor chip, and at least one additional heating element. By the use of this at least one additional heating element, the sensor chip is intended to be heatable. In the method according to the present invention, directly after shutting down the internal combustion engine, the at least one heating element is switched to a lower heating power, or which may be switched off, and the at least one additional heating element is switched on for a predefined postheating phase. In this context, the sensor chip may be heated essentially uniformly.

The method according to the present invention essentially uses three effects for avoiding oil contamination, these physical effects, however, collaborating in practice. In the first place, the effect of so-called thermophoresis is used. In thennophoresis, a so-called thennophoretic force is exerted on particles, which has the effect that small particles (oil, dust, etc.) in a field having a temperature gradient are pushed away from areas of high temperature to areas having a lower temperature. By the heating of the sensor chip, the air close to the chip becomes warmer than the air that is a little farther away from it. The temperature gradient above the sensor chip that is created thereby is sufficient largely to prevent the wetting of the sensor chip and especially of the sensor diaphragm with oil droplets, during the use of the hot-film air-mass sensor in the intake tract of an internal combustion engine. However, this effect works only if oil in droplet form is present, that is, as an aerosol and not as vapor. This effect is particularly effective, as was described above, if the whole sensor chip is heated uniformly.

Secondly, heating up the sensor chip, especially an even heating up of the sensor chip, has the effect of preventing oil condensation on a surface of the sensor chip, and especially on the sensor diaphragm. If the oil is present as oil vapor, condensation of oil on the chip surface is prevented by heating the chip to temperatures above the air temperature, similar to the effect of the fogging up of cold spectacles in humid air.

A third effect used in the method according to the present invention is that thermogradient turbulences in the gases above the chip are pushed to the edge of the sensor chip. By heating the sensor chip, at the edge of the sensor chip, especially at the transition between the sensor chip and the chip carrier, a temperature gradient is created which is a function of the thermal connection of the sensor chip to the chip carrier. This temperature gradient leads to temperature gradient turbulences, which in normal operation form especially in the region of the edges of the sensor diaphragm, move outwards right up to the edges of the sensor chips, which is a function of the thermal connection of the sensor chip to the chip carrier. Contaminations, especially with oil, which are present in droplets form, and are still in the air, may thereby be deposited at the edges of the sensor chips, where they do not lead to a characteristic drift of the hot-film air-mass sensor. In addition, the air over the measuring chip is additionally purified during this procedure.

As a rule, the oil mist appears in the vehicle, especially in the intake tract of the internal combustion engine, only after the ending of the operation of the internal combustion engine. At the moment of the shutting down of the internal combustion engine, the air in the crankcase unloads and escapes via the crankcase ventilation into the intake tract. At the installation space of the air mass sensor, as a rule, one may determine then (as a function of the vehicle) a brief temperature rise, connected with a backflow (counter to a main flow direction).

Although heating the sensor chip even during the operation of the internal combustion engine is entirely conceivable, it is sufficient to heat up the sensor chip only directly after shutting down the internal combustion engine. In this context, the absolute temperature is less decisive, but rather the speed at which this heating takes place. The heating operation of the sensor chip may be started using the at least one additional heating element after shutting down the internal combustion engine, which may be not later than one second after shutting down the internal combustion engine. In this context, the heating up may take place so quickly that, at the beginning of the postheating phase, within five seconds, the sensor chip is heated up, using the at least one additional heating element, by at least 10°, which may be by at least 20°. Overall, the postheating phase may last between five seconds and ten minutes, which may especially be between five seconds and five minutes, and ideally between ten seconds and three minutes. In this context, the at least one additional heating element should heat up the sensor chip in the postheating phase to a temperature of at least 40° C., which may be at least 60° C. and which particularly may be at least 80°. Higher temperatures increase the protective effect from contamination.

Since these temperatures still lie far below the typical operating temperature of the hot-film air-mass sensor of 200° C., the switching off or switching down of the heating element of the sensor diaphragm may be carried out within a time of not more than three seconds after shutting down the internal combustion engine, which may be within not more than one second, and which especially may be at the same time as the shutting down of the internal combustion engine. In this way, at the transition between the at least one heating element of the sensor diaphragm and the remaining surface of the sensor chip, thermogradient turbulences and consequently, contamination by oil droplets can be avoided.

The at least one additional heating element may be heated up simultaneously with the switching off or switching down of the at least one heating element of the sensor diaphragm. For instance, the at least one additional heating element can be switched on using a stepwise activation.

One essential advantage of the method according to the present invention, besides avoiding oil contamination, is the fact that, in the operation of the hot-film air-mass sensor, the thermal budget of the sensor chip is not disturbed. Thus, an evaluation circuit, which analyses the signals of the hot-film air-mass sensor, does not have to be changed for the sake of principle.

The exemplary embodiments and/or exemplary methods of the present invention is explained below in detail on the basis of the drawings and the description herein.

DETAILED DESCRIPTION

Figure 1:
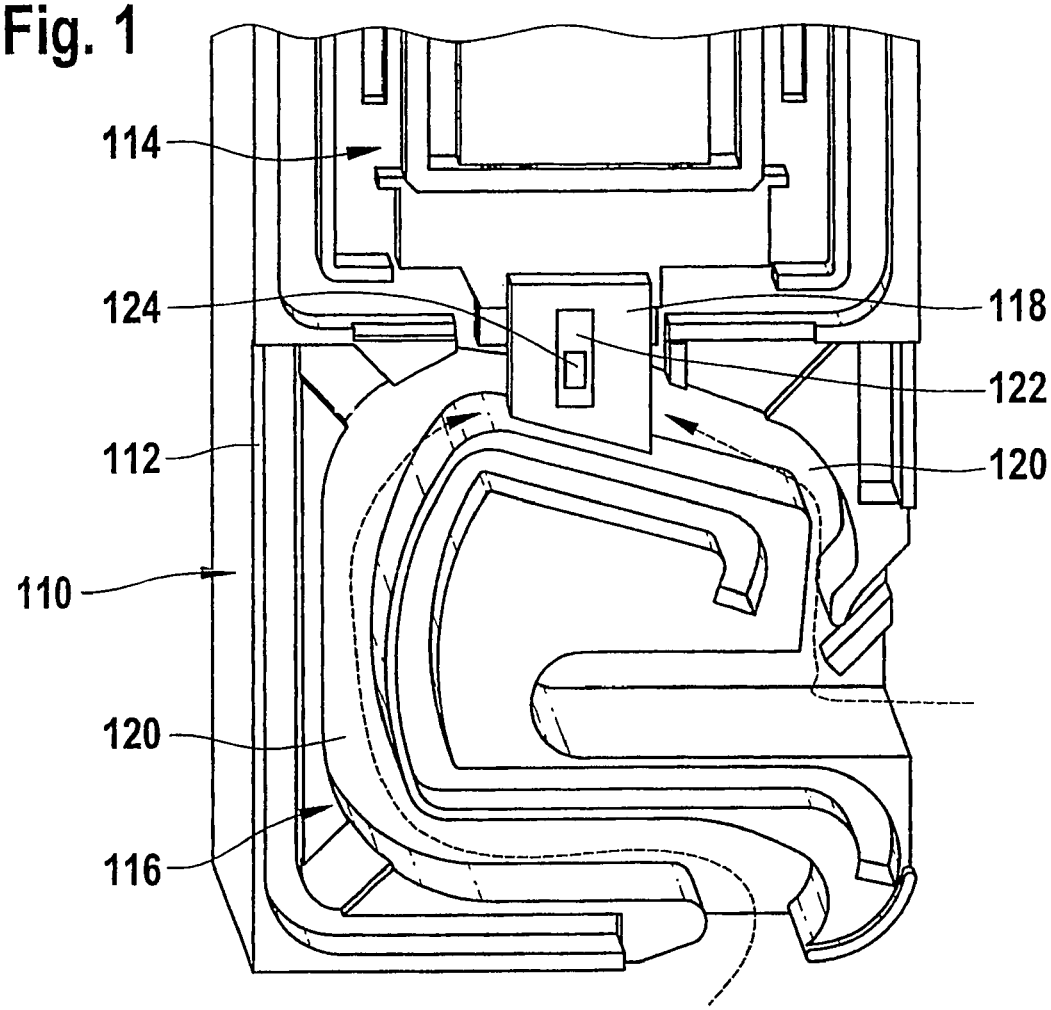
FIG. 1 shows a top view of an hot-film air-mass sensor having a sensor housing, a sensor carrier, a sensor chip and a bypass channel.

A hot-film air-mass sensor 110 is shown in FIG. 1, in a top view. Hot-film air-mass sensor 110 has a housing 112, which may be developed, for instance, as an injection molded component. Housing 112 has an electronic area 114 and a channel region 116. Electronic area 114 essentially has a recess for accommodating a sensor housing which, however, is not shown in FIG. 1, to keep things simple. Formed onto the sensor housing (for example, using an injection molding method) is a chip carrier 118 developed as sensor nose 118 which extends into a bypass channel 120 that is let into channel region 116 of housing 112. The entire hot-film air-mass sensor 110 is built into an intake tract of an internal combustion engine in such a way that air from the intake tract is able to flow out of the intake tract through bypass channel 120 to chip carrier 118.

Figure 1A:
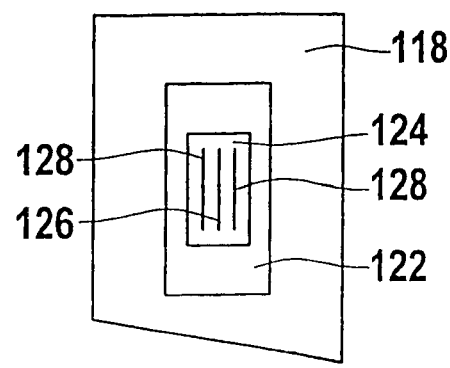
FIG. 1A shows a detailed illustration of a chip carrier used in the exemplary embodiment according to FIG. 1, having a sensor chip inserted.

A sensor chip 122 is let into chip carrier 118, and it has an active area in the form of a diaphragm 124. Sensor chip 122 is developed, for instance, according to the device known from the related art that was described above, and has at least one heating element 126 and at least two temperature sensors 128 on diaphragm 124 (see detailed representation of chip carrier 118 in FIG. 1A). The method of functioning of such hot-film air-mass sensors 110 according to the illustration in FIG. 1 and FIG. 1A is known from the related art.

Figure 2:
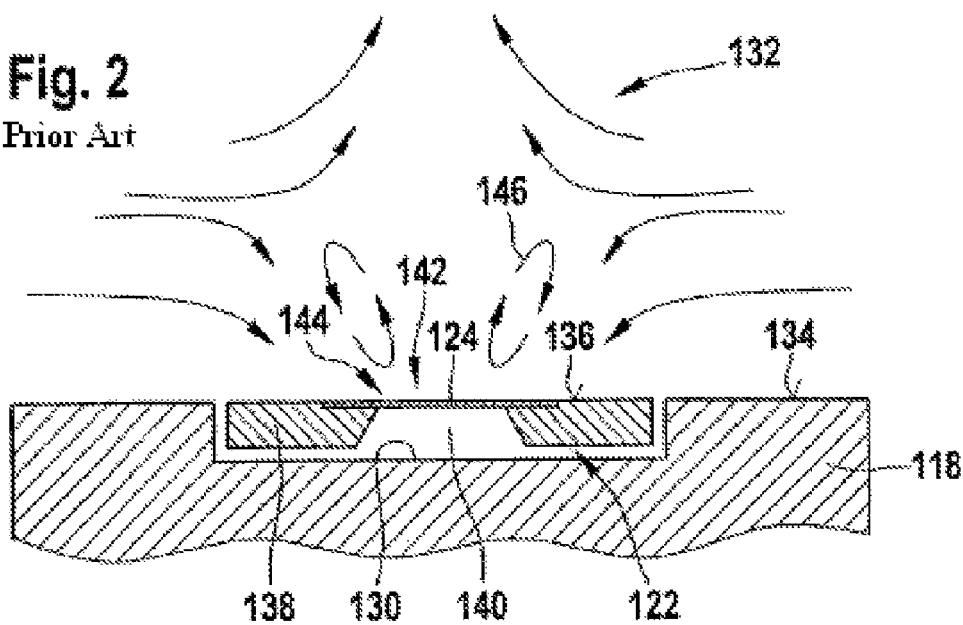
FIG. 2 shows a schematic representation of the course of flow of a flow medium over a conventional sensor chip.
Figure 3:
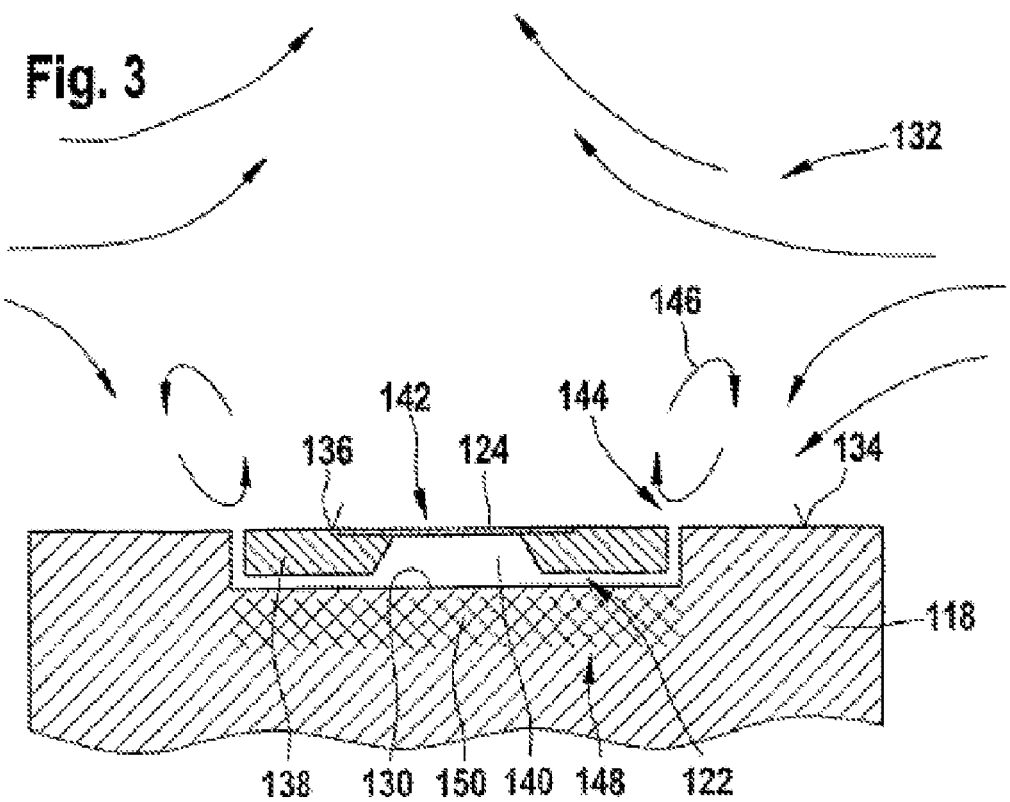
FIG. 3 shows a pattern of flow of a flow medium over a sensor chip that is evenly heated according to the exemplary embodiments and/or exemplary methods of the present invention.

As was described above, customary hot-film air-mass sensors 110 having the construction shown in FIG. 1 have, however, problems with contamination. These contamination problems, among other things, are in connection with the development of thermogradient turbulences. FIGS. 2 and 3 should make this clearer. Both figures show a sectional representation through a chip carrier 118. Chip carrier 118 has a depression 130, which is let into a surface 134, of chip carrier 118, that faces a flow medium. Sensor chip 122, in this instance, is let into depression 130 in such a way that a sensor surface 136 terminates essentially flush with surface 134. Sensor chip 122 has a sensor frame 138, which may be developed, for instance, as a silicon component. Sensor diaphragm 124 is mounted onto this sensor frame 138. Sensor frame 138 has an opening 140, in which sensor diaphragm 124 is developed essentially as a self-supporting film. In this region of opening 140, active area 142 of sensor chip 122 is developed on sensor surface 136, within this active area 142 heating element 126 and temperature sensors 128 (not shown in FIGS. 2 and 3) being situated on sensor surface 136.

Hot-film air-mass sensor 110 is usually operated so that heating element 126 is heated to about 200° C. Consequently, in the operation in active area 142 of sensor chip 122, temperatures of this order of magnitude prevail. At the border between active area 142 and sensor frame 138, which usually has a temperature of ca. 20-30° C. during operation, a large temperature gradient is thus formed. Accordingly, thermogradient turbulences 146 form in flow medium 132 in this transitional region. Within the region of these thermogradient turbulences 146, there consequently forms an oil deposit area 144 on sensor surface 136, in which oil droplets or oil mist deposit from flow medium 132.

In the exemplary embodiment corresponding to the related art, shown in FIG. 2, sensor chip 122 is not heated additionally, or only in the area of sensor diaphragm 124, as is described, for example, in DE 101 11 840 C2. By contrast, an exemplary embodiment according to the present invention is shown in FIG. 3, in which sensor chip 122 is heated over a heating zone 148, that is indicated symbolically in FIG. 3, using an additional heating element 150. In this context, it is of advantage if heating zone 148 is designed so that the sensor chip is heated evenly. The deviations of the temperatures on sensor surface 136 advantageously amount to no more than 20 percent, in this instance.

In order to achieve this, heating zone 148 can be developed in various ways. Heating zone 148 can, for example, be let into chip carrier 118, as shown in FIG. 3, for instance, in the form of an additional heating element 150 that is integrated into chip carrier 118. Alternatively, or in addition, an additional heating element 150 may also be deployed on sensor surface 136, this additional heating element 150 heating entire sensor surface 136, which may be over a large surface and evenly, and which may not be only diaphragm 124. For this purpose, for instance, additional heating elements 150 can be applied onto sensor surface 136, in the form of heating traces, for example. Additional heating elements 150 may also be accommodated on the inside of sensor chip 122, for instance, the inside of sensor frame 138. Additional heating elements 150 are shown only symbolically in FIG. 3.

According to the exemplary embodiments and/or exemplary methods of the present invention, in the design according to FIG. 3, heating zone 148 is developed so that, using this heating zone 148, sensor chip 122 can be heated, essentially, in a homogeneous manner. In experiments with regard to this, the heating up of sensor chip 122 (that is, especially of sensor surface 136) to a temperature of at least 40° C. to 60° C., and which may be higher (for instance, 80° C. to 90° C.) has proven itself. Because of this, as shown in FIG. 3, thermogradient turbulences 146 are pushed away from active surface 142 to the edge of sensor chip 122, so that a particle-free space is created above sensor chip 122, based on the effect of thermophoresis. Consequently, oil deposit area 144 also shifts away from active surface 142 to the edge of sensor chip 122 and to the transitional area between sensor chip 122 and chip carrier 118.

The additional heating element can be integrated into chip carrier 118, below sensor chip 122, as shown in FIG. 3. If additional heating element 150 is developed, for example, in a planar manner, this makes it possible to attain with it a uniform heating of sensor chip 122. It is, of course, also possible to develop additional heating element 150 as a part of sensor chip 122. In that case, sensor chip 122 and additional heating element 150 represent one component. Besides that, the at least one additional heating element 150 can also include several heating resistors that are components of sensor chip 122, or which are applied to the upper face of sensor chip 122.

Figure 4:
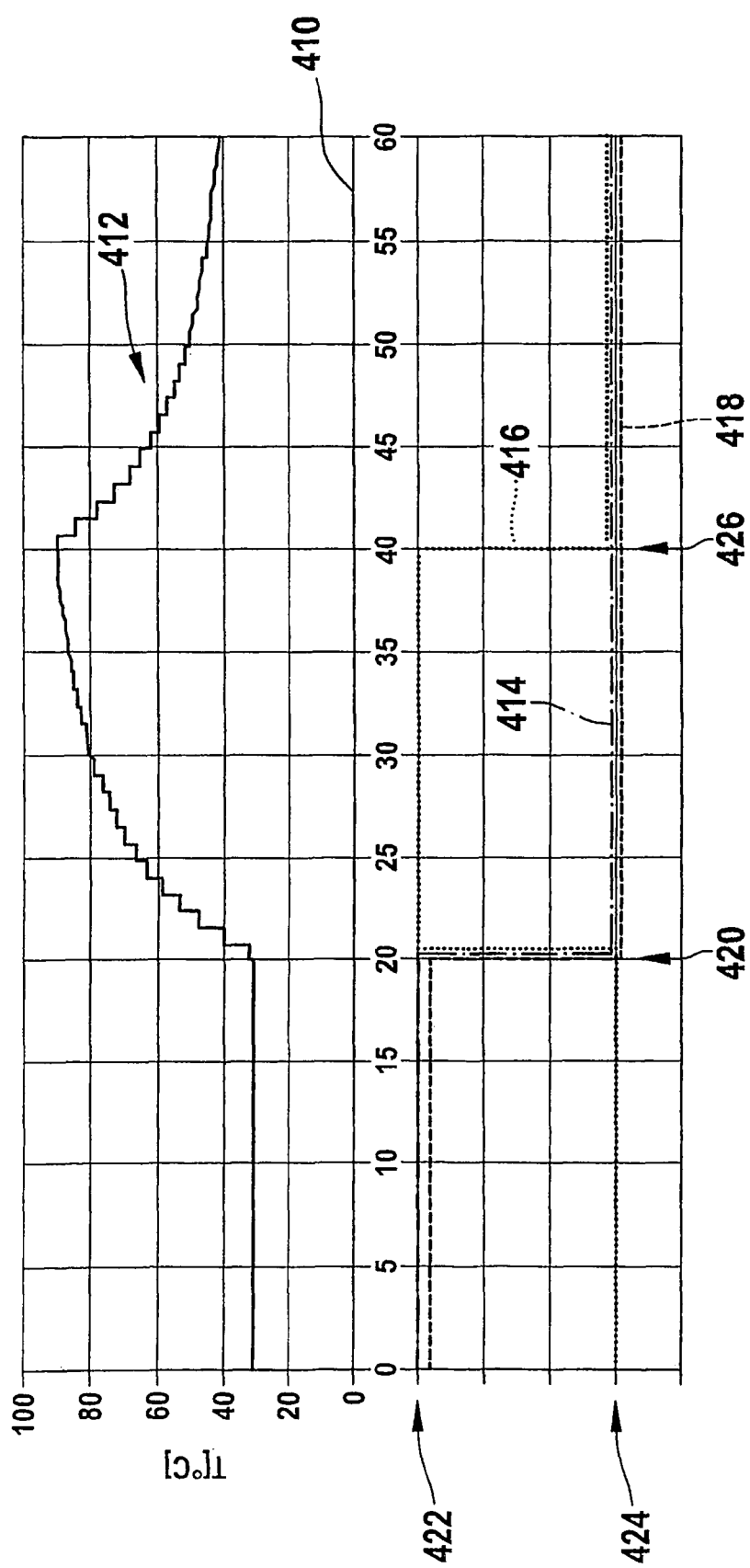
FIG. 4 shows a schematic representation of the curve over time of the heating of a hot-film air-mass sensor according to the present invention.

Directly after the shutting down of the internal combustion engine, the at least one heating element 126 of hot-film air-mass sensor 110 is to be switched off, according to the exemplary embodiments and/or exemplary methods of the present invention. FIG. 4 shows a specific embodiment of a possible time curve of an operation of a hot-film air-mass sensor 110. Abscissa 410 represents the time in seconds, in this instance. Chip temperature 412 in degrees centigrade is plotted in the upper area of FIG. 4. In the lower area of FIG. 4, the time curves of the switching states of the hot-film air-mass sensor (curve 414), the chip heater (curve 416) and the internal combustion engine (curve 418) are plotted.

As shown in the lower part of FIG. 4, at a first point in time 420, the internal combustion engine is shut down. This time 420 is arbitrarily at 20 seconds, in this case.

Consequently, the internal combustion engine switches from a first switching state 422 ("on") to switching state 424 ("off") as shown here in FIG. 4, using a step in switching state 418 of the internal combustion engine. At the same time, or directly thereafter, heating element 126 of sensor chip 122 is switched off, that is, it is transferred from switching state "on" (reference numeral 422) to switching state "off" (reference numeral 424). This is shown in FIG. 4 in the bottom part by a step in switching state function 414 of hot-film air-mass sensor 110. It is also conceivable to transfer to an intermediate switching state, for instance, a slightly heated state, that is, an incomplete switching off. As is made clear by the positive slope at time 420 in switching state function 416 of the chip heater, additional heating element 150 of sensor chip 122 is simultaneously switched on, in order to heat up sensor chip 122 in a continuous fashion. In this process, temperature 412 of sensor chip 122 (cf. upper part of FIG. 4) increases slowly, starting from an operating temperature of ca. 30° C., and finally reaches a temperature of ca. 90° C.

At a second time 426, which occurs in this exemplary embodiment twenty seconds after first time 420, at which the internal combustion engine was shut down, additional heating element 150 is also switched off. In this exemplary embodiment, the postheating phase thus amounts to 20 seconds. As a result, chip temperature 412, starting from the 90° C. it had reached, slowly drops off again and asymptotically approaches the operating temperature of ca. 30° C.

Using an exemplary time scheme for operating an hot-film air-mass sensor 110 shown in FIG. 4, oil deposits on hot-film air-mass sensors in internal combustion engines can be largely avoided. In this context, a deposit of oil on sensor surface 136 is largely avoided by the postheating phase of twenty seconds, in this exemplary embodiment, while utilizing the above-named effects (thermophoresis, preventing condensation, shifting thermogradient turbulences 146 to the edge of sensor chip 122).

The switching of the at least one additional heating element can be triggered by an external switch in an engine control device, or a switch (IC) integrated into hot-film air-mass sensor 110.

The List of reference numerals is as follows:
110 hot-film air-mass sensor
112 housing
114 electronic area
116 channel region
118 chip carrier
120 bypass channel
122 sensor chip
124 diaphragm
126 Heating element
128 temperature sensors
130 depression
132 flow medium
134 surface facing the flow medium
136 sensor surface
138 sensor frame
140 opening
142 active area
144 oil deposit area
146 thermogradient turbulence
148 heating zone
150 additional heating element
410 abscissa, time
412 chip temperature
414 switching state hot-film air-mass sensor
416 switching state chip heater
418 switching state internal combustion engine
420 shutting down internal combustion engine
422 switching state "on"
424 switching state "off"

What is claimed is:

1. A method for operating a hot-film air-mass sensor for measuring air mass flows in an intake tract of an internal combustion engine, the hot-film air-mass sensor includes a sensor chip having a sensor frame and a sensor diaphragm having at least one heating element and at least two temperature sensors, a chip carrier for holding the sensor chip and the hot-film air-mass sensor including at least one additional heating element, the method comprising:

a) immediately after shutting down the internal combustion engine, switching off or switching to a lower heating power the at least one heating element of the sensor diaphragm; and
b) switching on the at least one additional heating element for a specified postheating phase;
wherein the at least one additional heating element is situated in the chip carrier under the sensor chip, and
wherein the sensor chip is heatable using the at least one additional heating element of the sensor chip.

2. The method of claim 1, wherein the sensor chip is essentially uniformly heated using the at least one additional heating element.

3. The method of claim 1, wherein the switching off or switching to lower heating power the at least one heating element of the sensor diaphragm is carried out within a time of not more than 3 seconds after shutting down the internal combustion engine.

4. The method of claim 1, wherein the switching on the at least one additional heating element for a specified postheating phase is started not later than 3 seconds after shutting down the internal combustion engine.

5. The method of claim 1, wherein the postheating phase has a time duration between 5 seconds and 10 minutes.

6. The method of claim 1, wherein the at least one additional heating element heats up the sensor chip in the postheating phase to a temperature of at least 40° C.

7. The method of claim 1, wherein the at least one additional heating element heats up the sensor chip at the beginning of the postheating phase within 5 seconds by at least 10° C.

8. The method of claim 1, wherein the at least one additional heating element is switched off during the operation of the internal combustion engine.

9. The method of claim 1, wherein the switching on of the at least one additional heating element takes place using a stepped driving of the at least one additional heating element.

10. The method of claim 1, wherein the switching off or switching to lower heating power the at least one heating element of the sensor diaphragm is carried out within a time of not more than 1 seconds after shutting down the internal combustion engine.

11. A hot-film air-mass sensor, comprising:
a sensor arrangement including:
a chip carrier for holding a sensor chip, which includes a sensor diaphragm having at least one heating element and at least two temperature sensors; and
at least one additional heating element for uniformly heating the sensor chip, wherein the at least one additional heating element is situated in the chip carrier under the sensor chip;
wherein the sensor arrangement is operable for measuring air mass flows in an intake tract of an internal combustion engine, by performing the following:
a) immediately after shutting down the internal combustion engine, switching off or switching to a lower heating power the at least one heating element of the sensor diaphragm; and
b) switching on the at least one additional heating element for a specified postheating phase.

* * * * *